US012734897B2

(12) United States Patent
Hayashi et al.

(10) Patent No.: US 12,734,897 B2
(45) Date of Patent: Sep. 15, 2026

(54) MOTOR UNIT

(71) Applicant: TOYOTA JIDOSHA KABUSHIKI KAISHA, Aichi (JP)

(72) Inventors: Ryuta Hayashi, Aichi-gun (JP); Akitaka Ichikawa, Nisshin (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 72 days.

(21) Appl. No.: 18/432,054

(22) Filed: Feb. 5, 2024

(65) Prior Publication Data

US 2024/0262213 A1 Aug. 8, 2024

(30) Foreign Application Priority Data

Feb. 8, 2023 (JP) ................................ 2023-017908

(51) Int. Cl.
*H02K 5/22* (2006.01)
*B60L 15/00* (2006.01)
*B60L 53/24* (2019.01)

(52) U.S. Cl.
CPC ............. *B60L 15/007* (2013.01); *B60L 53/24* (2019.02); *B60L 2210/40* (2013.01)

(58) Field of Classification Search
CPC ..... B60L 15/007; B60L 53/24; B60L 2210/40
See application file for complete search history.

(56) References Cited

U.S. PATENT DOCUMENTS 8,344,564 B2 * 1/2013 Yoshida ................ B60W 10/08 310/71
9,692,277 B2 6/2017 Pearce, Jr. et al.
2011/0057611 A1 * 3/2011 Nakaso ................ B60W 20/15 320/109
2019/0106002 A1 4/2019 Götz et al.
2020/0262481 A1 8/2020 Yamada et al.
2021/0336569 A1 * 10/2021 Xia ......................... H02P 21/22
2022/0161659 A1 * 5/2022 Choi .................. H01M 50/249
2022/0186823 A1 6/2022 Yamashita et al.
2024/0305160 A1 * 9/2024 Takahashi ............. H02K 7/116
2025/0128636 A1 * 4/2025 Raguse .................. B60L 53/62

FOREIGN PATENT DOCUMENTS

DE 102020104443 A1 9/2020
JP 2013-009509 A 1/2013
JP 2020-100364 A 7/2020
JP 2021-112116 A 8/2021
KR 10-2014-0075035 A 6/2014

* cited by examiner

*Primary Examiner* — Menatoallah Youssef
*Assistant Examiner* — Esayas G Yeshaw
(74) *Attorney, Agent, or Firm* — HAUPTMAN HAM, LLP

(57) ABSTRACT

A drive device disclosed herein may include: a motor casing housing the electric motor; a gear connected to the electric motor; a gear casing housing the gear; an inverter electrically connected to the electric motor; an inverter casing housing the inverter; and a relay box including at least one relay and having a relay circuit configured to connect a charging inlet of the vehicle to a neutral point of the electric motor and to the inverter. The motor casing, the gear casing, and the inverter casing may be arranged in this order along an axial direction extending parallel to a rotation axis of the electric motor. The relay box may be mounted at least to the gear casing in a first direction intersecting the rotation axis of the electric motor.

18 Claims, 4 Drawing Sheets

10
30
31
91P
91N
92P
92N
70
76
65
78
5R
22L
57L
56
73
61
60
62
7
51
50
46W
46V
46U
54
52
90
49
40
48
42
41
A1
94
74
45
77
22R
57R
32
FR
UP
LH
20
72
26C
71
35
55
IV

UP
FR
LH
22R
22L
5R
72
71
73
30
31
32
79
57L
57R
57U
39
95
35
94
91P
91N
92P
92N
78
58
56
50
59
55
77
40
45
65
60
61

MOTOR UNIT

REFERENCE TO RELATED APPLICATIONS

This application claims priority from Japanese Patent Application No. 2023-017908 filed on Feb. 8, 2023. The entire content of the priority application is incorporated herein by reference.

BACKGROUND ART

Background

A drive device for a vehicle including an electric motor that drives a wheel of the vehicle, a gear connected to the electric motor, an inverter electrically connected to the electric motor, and a casing is known. The casing of the drive device includes an equipment housing chamber housing the electric motor, a gear housing chamber housing the gear, and an inverter housing chamber housing the inverter. In the drive device, the inverter housing chamber is arranged relative to the gear housing chamber in a direction perpendicular to a rotation axis of the gear.

Description

SUMMARY

On a drive device for a vehicle, a relay circuit that connects an inverter to a charging inlet of the vehicle may be provided. Since the relay circuit is connected to a neutral point of the electric motor in addition to the inverter, wiring that connects the relay circuit to the drive device tends to be complex. As a result, a casing of the drive device including the relay circuit may become larger. The present disclosure provides a technique that can reduce a size of a casing of a drive device including a relay circuit.

The drive device disclosed herein may comprise: an electric motor configured to drive a wheel of a vehicle; a motor casing housing the electric motor; a gear connected to the electric motor; a gear casing housing the gear; an inverter electrically connected to the electric motor; an inverter casing housing the inverter; and a relay box including at least one relay and having a relay circuit configured to connect a charging inlet of the vehicle to a neutral point of the electric motor and to the inverter. The motor casing, the gear casing, and the inverter casing may be arranged in this order along an axial direction extending parallel to a rotation axis of the electric motor. The relay box may be mounted to at least the gear casing in a first direction intersecting the rotation axis of the electric motor.

In the vehicle described above, the motor casing, the gear casing, and the inverter casing are arranged in this order along an axial direction extending parallel to a rotation axis of the electric motor. Further, the relay box is mounted at least to the gear casing in the first direction intersecting the rotation axis of the electric motor. Thus, the drive device may have a reduced casing size, especially with respect to the first direction, as compared to a conventional technique in which an inverter casing is mounted to a gear casing in the first direction.

Details and further improvements of the technique disclosed herein will be described in Detailed Description below.

EMBODIMENT

Figure 1:
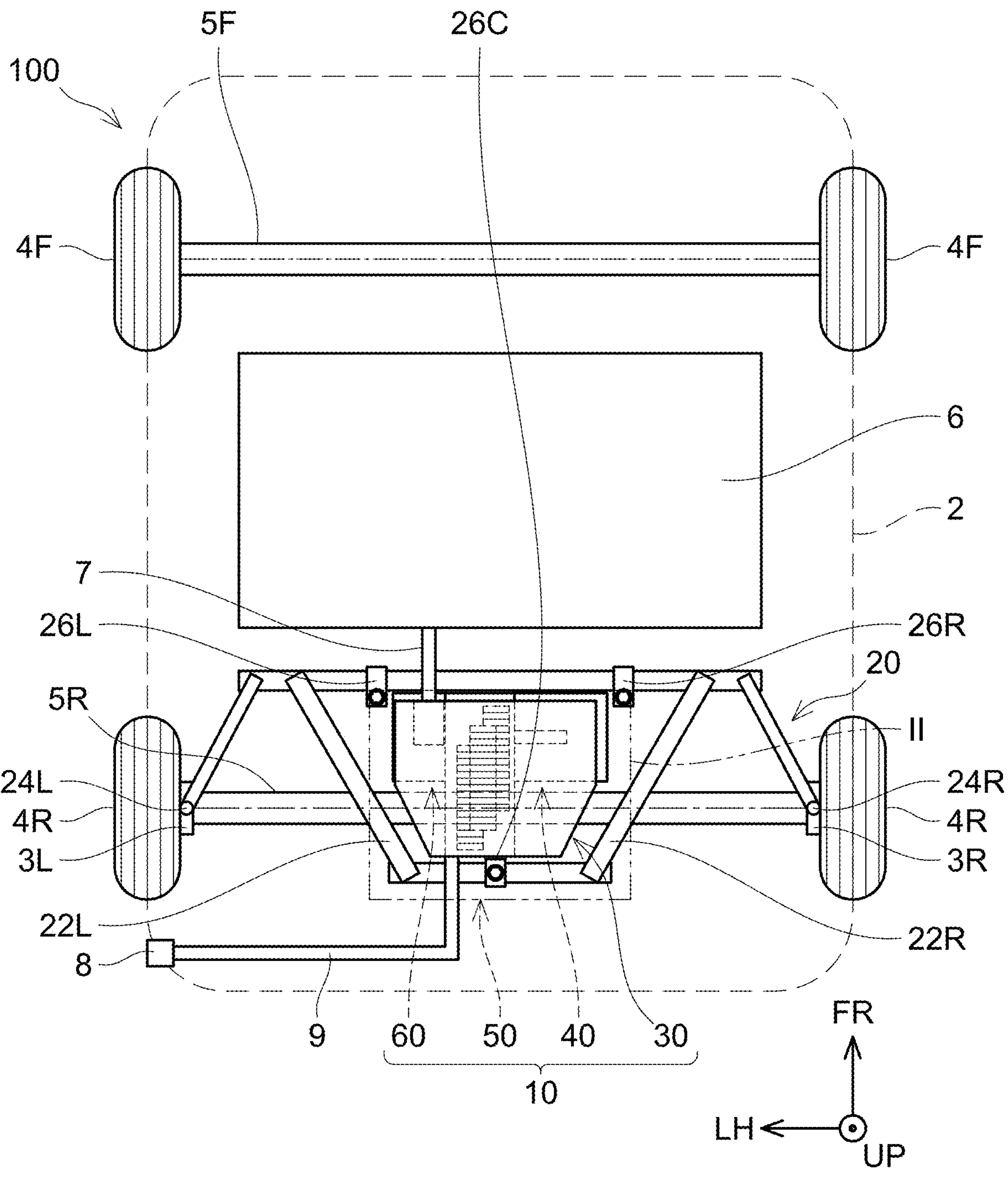
FIG. 1 shows a plan view of an electric vehicle 100 on which a drive device 10 of an embodiment is mounted.

In one embodiment of the present technique, a connecting hole may be defined between the gear casing and the relay box. In that case, an inverter connection circuit connecting the inverter and the relay circuit may extend from the inverter casing to the gear casing and pass through the connecting hole. According to this configuration, the inverter connection circuit can connect the inverter and the relay circuit through the connecting hole. Consequently, the drive device can have a reduced casing size as compared to a configuration in which the inverter connection circuit is routed on the outer surface of the inverter casing.

In one embodiment of the present technique, the relay box may be mounted to the motor casing, the gear casing, and the inverter casing in the first direction. However, in another embodiment, for example, the relay box may be mounted only to the gear casing in the first direction, or be mounted to the inverter casing and the gear casing in the first direction.

In one embodiment of the present technique, the axial direction may extend along a horizontal direction. In that case, the relay box may mounted at least to the gear casing from above. In other words, the first direction may be oriented downward from above. However, in another embodiment, the first direction may be oriented upward or may be oriented forward.

In one embodiment of the present technique, the gear casing may include a protruding portion protruding with respect to the motor casing and the inverter casing in a second direction intersecting the axial direction and the first direction. In that case, the relay box may include a first portion facing the protruding portion in the first direction and a second portion facing the protruding portion from one side in the axial direction. Further, the second portion of the relay box may face one of the motor casing and the inverter casing in the second direction. According to this configuration, the second portion of the relay box is adjacent to the protruding portion of the gear casing in the axial direction and adjacent to one of the motor casing and the inverter casing in the second direction. This can reduce the casing size of the drive device in the first direction as compared to, for example, a configuration in which the second portion of the relay box is arranged with the first portion thereof in the first direction.

In one embodiment of the present technique, the relay box may further include a third portion facing the protruding portion from the other side in the axis direction. In that case, the second portion of the relay box may face the motor casing in the second direction, and the third portion of the relay box may face the inverter casing in the second direction. According to this configuration, the second portion of the relay box is adjacent to the protruding portion of the gear casing from one side in the axial direction, and adjacent to the motor casing in the second direction. Further, the third portion of the relay box is adjacent to the protruding portion of the gear casing from the other side in the axial direction and is adjacent to the inverter casing in the second direction. This can reduce the casing size of the drive device in the first direction as compared to, for example, a configuration in which the second and third portions of the relay box are arranged with the first portion thereof in the first direction.

In one embodiment of the present technique, the drive device may be mounted to a subframe fixed to a body of the vehicle. In that case, the second portion and the third portion of the relay box may be located in a space between the protruding portion of the gear casing and the subframe. However, in another embodiment, the drive device may be mounted directly on the body of the vehicle.

In one embodiment of the present technique, the subframe may be a suspension member to which a suspension of the vehicle is fixed. However, in another embodiment, the subframe may be, for example, a side member that extends along a length direction of the vehicle.

In one embodiment of the present technique, a connecting hole may be defined between the gear casing and the relay box. In that case, an inverter connection circuit connecting the inverter and the relay circuit and a neutral point connection circuit connecting the relay circuit and the neutral point of the electric motor may pass through the connecting hole. According to this configuration, both the inverter connection circuit and the neutral point connection circuit are integrated in the connecting hole. This allows the inverter and the neutral point of the electric motor to be connected to the relay circuit by a relatively simple structure.

In one embodiment of the present technique, a connecting hole may be defined between the gear casing and the relay box. Further, the relay circuit may further include a connector to which a circuit extending from a battery of the vehicle is connected. In that case, an inverter connection circuit connecting the inverter and the relay circuit and a connector connection circuit connecting the inverter and the connector may pass through the connecting hole. According to this configuration, both the inverter connection circuit and the connector connection circuit are integrated in the connecting hole. This allows the inverter and the connector to be connected to the relay circuit by a relatively simple structure.

In one embodiment of the present technique, a connecting hole may be defined between the gear casing and the relay box. Further, the relay circuit may further include a connector to which a circuit extending from a battery of the vehicle is connected. In that case, an inverter connection circuit connecting the inverter and the relay circuit, a neutral point connection circuit connecting the relay circuit and the neutral point of the electric motor, and a connector connection circuit connecting the inverter and the connector may pass through the connecting hole. According to this configuration, the inverter connection circuit, the neutral point connection circuit, and the connector connection circuit are all integrated in the connecting hole. This allows the inverter, the neutral point of the electric motor, and the connector to be connected to the relay circuit by a relatively simple structure.

Embodiments

FIG. 1 shows a plan view of an electric vehicle 100 on which a drive device 10 of an embodiment is mounted. In addition to the drive device 10, the electric vehicle 100 includes a body 2, a front driveshaft 5F, a pair of front wheels 4F, a rear driveshaft 5R, a pair of rear wheels 4R, a battery pack 6, and a charging inlet 8. For easier understanding, the body 2 of the electric vehicle 100 is shown by a dashed line in FIG. 1. The electric vehicle 100 herein includes a fuel cell vehicle as well as an electric vehicle. In the coordinate system in the drawings, FR indicates the front side of the electric vehicle 100, UP indicates the upper side of the electric vehicle 100, and LH indicates the left side of the electric vehicle 100. In the following, “up”, “down”, “left”, “right”, “front”, and “rear” are described based on the coordinate system in the drawings.

The pair of front wheels 4F is provided at opposite ends of the front driveshaft 5F, and the pair of rear wheels 4R is provided at opposite ends of the rear driveshaft 5R via hubs 3L, 3R.

The battery pack 6 is located below the body 2 of the electric vehicle 100. The battery pack 6 is configured to supply power to the drive device 10. Consequently, the drive device 10 drives the pair of rear wheels 4R. The battery pack 6 houses a plurality of rechargeable battery cells (not shown), such as lithium-ion cells, for example, and is configured for repetitive charge and discharge. The drive device 10 can also function as a generator for regenerative braking of the electric vehicle 100. The power generated by the drive device 10 is supplied to the battery pack 6 to charge the battery pack 6.

The charging inlet 8 is provided on the outer surface of the body 2 of the electric vehicle 100. The charging inlet 8 is a port for connecting the battery pack 6 to an external charging device. The charging inlet 8 is configured to be detachably attached to a connector of the external charging device.

The drive device 10 includes a plurality of devices connected to each other. Specifically, the drive device 10 includes a motor unit 40, a gear unit 50, an inverter unit 60, and a relay box 30. The drive device 10 is located below a rear seat (not shown) of the electric vehicle 100 and is mounted to a rear suspension member 20 from above. In a variant, the drive device 10 may be located below a board constituting the bottom of a luggage space of the electric vehicle 100.

The rear suspension member 20 includes a pair of upper arms 22L, 22R, a pair of rear suspensions 24L, 24R, and three brackets 26C, 26L, 26R. The rear suspension member 20 is constituted of a plurality of frames. The rear suspension member 20 is fixed to the body 2 of the electric vehicle 100 from above.

The pair of rear suspensions 24L, 24R are attached to the left and right ends of the rear suspension member 20. The pair of rear suspensions 24L and 24R suppress vibration generated when the pair of rear wheels 4R is being driven from being transmitted to the vehicle body 2 via the hubs 3L and 3R.

The left upper arm 22L shifts its position leftward toward its front side. The right upper arm 22R shifts its position rightward toward its front side. The pair of upper arms 22L and 22R are left-right symmetrical. The pair of upper arms 22L and 22R is frames to improve rigidity of the rear suspension member 20.

The drive device 10 is mounted to the rear suspension member 20 via three brackets 26C, 26L, and 26R. The brackets 26L and 26R fix the ends of a front portion of the drive device 10 in a left-right direction to the rear suspension member 20. The bracket 26C fixes the center portion of a rear portion of the drive device 10 in the left-right direction to the rear suspension member 20.

Figure 2:
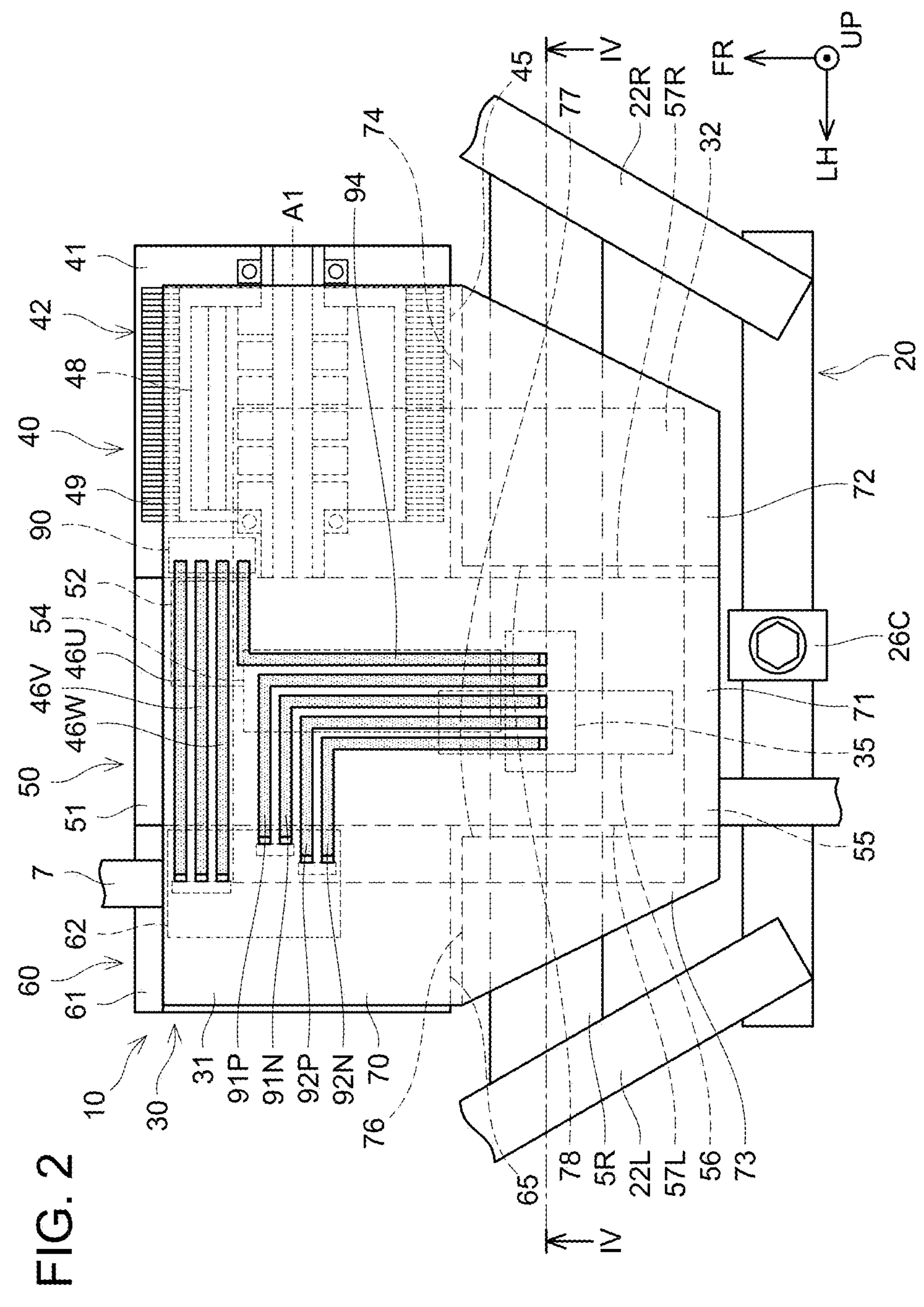
FIG. 2 shows an enlarged view of an area surrounded by line II in FIG. 1.

Referring to FIG. 2, details of the drive device 10 will be described. The motor unit 40 of the drive device 10 includes a motor 42 and a motor casing 41 that houses the motor 42. The gear unit 50 includes a link gear 52 mechanically connected to the motor 42, a differential gear 56 connected to the rear driveshaft 5R, an intermediate gear 54 provided between the link gear 52 and the differential gear 56, and a gear casing 51 housing each gear 52, 54, 56. The inverter unit 60 includes an inverter 62 electrically connected to the motor 42 and an inverter casing 61 housing the inverter 62.

Each casing 41, 51, 61 has a box shape that is relatively flat in the front-rear and up-down directions. The casings 41, 51, 61 are arranged in this order from the right along an axial direction parallel to the rotation axis A1 of the motor 42 (i.e., in a width direction of the electric vehicle 100). In other words, when viewed along the axial direction parallel to the rotation axis A1 of the motor 42, the casings 41, 51, 61 overlap each other. The motor casing 41 is fixed to the gear casing 51 adjacent thereto. The gear casing 51 is fixed to the inverter casing 61 adjacent thereto. In a variant, the adjacent casings may not be fixed to each other. For example, a cooling casing including a channel to which a refrigerant to cool the inverter 62 is supplied may be arranged, for example, between the gear casing 51 and the inverter casing 61. In a further variant, the gear casing 51 and the inverter casing 61 may be arranged to be axially spaced apart from each other.

In the drive device 10 of the present embodiment, the link gear 52, the intermediate gear 54, and the differential gear 56 are housed in the gear casing 51. The differential gear 56 is connected to the rear driveshaft 5R which extends to the pair of rear wheels 4R along the axial direction parallel to the rotation axis A1. The gear casing 51 includes a protruding portion 55 that protrudes rearward relative to the motor casing 41 and the inverter casing 61. This allows the rear driveshaft 5R connected to the differential gear 56 to extend behind the motor casing 41 and inverter casing 61 to the pair of rear wheels 4R.

The relay box 30 includes a relay casing 31. The relay casing 31 has a box shape that is relatively flat in the front-rear and left-right directions. The relay casing 31 houses a plurality of relay circuits as described below. The relay casing 31 is mounted to each casing 41, 51, 61 from above (i.e., into the page of FIG. 2). In other words, the relay box 30 is mounted to each casing 41, 51, 61 in a direction intersecting the rotation axis A1 of the motor 42. Relay circuits of the relay box 30 are connected to the battery pack 6 (see FIG. 1) via a power cable 7. The relay circuits of the relay box 30 are connected to the charging inlet 8 (see FIG. 1) via the charging cable 9.

The motor 42 housed in the motor casing 41 is an electric motor configured to drive the rear wheels 4R of the electric vehicle 100 using power supplied from the battery pack 6. The motor 42 includes a rotor 48 and a stator coil 49. The rotor 48 extends horizontally along the rotation axis A1 of the motor 42. The rotor 48 passes through the right side wall of the motor casing 41 and is connected to the link gear 52 housed in the gear casing 51. Thereby, the rotational motion of the rotor 48 is transmitted to the link gear 52.

Although the details will be explained by referring to FIG. 3, the stator coil 49 includes a U phase circuit 46U, a V phase circuit 46V, and a W phase coil 43W. In other words, the motor 42 is a three-phase AC motor. The motor casing 41 further houses a terminal block 90. The terminal block 90 connects the U phase coil 43U of the stator coil 49 to a U phase circuit 46U. Similarly, the terminal block 90 connects the V phase coil 43V to a V phase circuit 46V and the W phase coil 43W to a W phase circuit 46W. In addition, the terminal block 90 connects the neutral point connection circuit 94 to a neutral point 44 of the motor 42.

Circuits that electrically connect the devices of the drive device 10 will be described. For easier understanding, in FIG. 2, each circuit located below the relay box 30 is shown by a solid line. A connecting hole 35 is defined between a lower surface of the relay casing 31 and the protruding portion 55 of the gear casing 51. The connecting hole 35 connects the interior space of the relay casing 31 to the interior space of the protruding portion 55 of the gear casing 51.

The motor 42 is electrically connected to the inverter 62 via the phase circuits 46U, 46V, and 46W. In addition, the motor 42 is electrically connected to the relay circuit housed in the relay casing 31 of the relay box 30 via the neutral point connection circuit 94. Similarly, the inverter 62 is electrically connected to the relay circuit housed in the relay casing 31 via inverter connection circuits 91P, 91N and connector connection circuits 92P, 92N. These circuits 46U, 46V, 46W, 94, 91P, 91N, 92P, 92N are routed in upper spaces inside the casings 41, 51, 61.

For example, the phase circuits 46U, 46V, and 46W connecting the motor 42 to the inverter 62 are located above the link gear 52 (i.e., out of the page of FIG. 2 relative to the link gear 52) and below the relay box 30 (i.e., into the page of FIG. 2 relative to the relay box 30). The phase circuits 46U, 46V, 46W extend leftward in the gear casing 51. The phase circuits 46U, 46V, 46W pass through the gear casing 51 and is connected to the inverter 62 in the inverter casing 61. As described above, the phase circuits 46U, 46V, 46W electrically connects the stator coil 49 of the motor 42 to the inverter 62.

Similarly, the neutral point connection circuit 94 which connects the motor 42 to the relay circuit is located above the link gear 52 and below the relay box 30. The neutral point connection circuit 94 extends leftward from the terminal block 90 through the left side wall of the motor casing 41. The neutral point connection circuit 94 further bends rearward and extends into the protruding portion 55 of the gear casing 51. The neutral point connection circuit 94 bends at a location below the connecting hole 35 in the relay casing 31 and extends upward. The neutral point connection circuit 94 extends through the connecting hole 35 and into the relay casing 31. As described above, the neutral point connection circuit 94 electrically connects the neutral point of the motor 42 to the relay circuit of the relay box 30.

Further, the inverter connection circuits 91P, 91N and the connector connection circuits 92P, 92N which connect the inverter 62 to the relay circuit are located above the intermediate gear 54 and the differential gear 56 and below the relay box 30. The connection circuits 91P, 91N, 92P, 92N extend parallel to each other. Each connection circuit 91P, 91N, 92P, 92N extends rightward through the right side wall of the inverter casing 61. Each connection circuit 91P, 91N, 92P, 92N bends rearward and extends into the protruding portion 55 of the gear casing 51. Each connecting circuit 91P, 91N, 92P, 92N bends at a location below the connecting hole 35 and extends upward. Each connection circuit 91P, 91N, 92P, 92N extends into the relay casing 31 through the connecting hole 35. As described above, each connection circuit 91P, 91N, 92P, 92N electrically connects the inverter 62 to the relay circuit of the relay box 30.

A circuit configuration of the drive device 10 will be described with reference to FIG. 3. In FIG. 3, the relay circuits housed in the relay casing 31 are enclosed in two-dot-chain lines, and the circuits housed in the motor casing 41 and the inverter casing 61 are enclosed in dashed lines. The relay box 30 houses a system main relay circuit 36 and a charging relay circuit 32 in the relay casing 31. In the drive device 10, the charging relay circuit 32, the motor 42, the inverter 62, and the system main relay circuit 36 are connected between the charging inlet 8 and the battery pack 6. In the following, the charging inlet 8 side may be described as “upstream side” and the battery pack 6 side may be described as “downstream side”.

The charging relay circuit 32 is connected downstream of the charging connector 80 connected to the charging inlet 8. The charging relay circuit 32 is connected upstream of the motor 42 and the inverter 62. The charging relay circuit 32 is connected to the neutral point 44 of the motor 42 via the neutral point connection circuit 94. The charging relay circuit 32 is connected to the inverter 62 via the inverter connection circuits 91P and 91N. In other words, the charging relay circuit 32 connects the charging inlet 8 to the neutral point 44 of the motor 42 and to the inverter 62.

The charging relay circuit 32 includes a pair of relays 33P, 33N and a charging smoothing capacitor 34. The pair of relays 33P and 33N electrically connects and disconnects the charging inlet 8, the motor 42, and the inverter 62. The charging smoothing capacitor 34 stabilizes voltage of the circuits of the drive device 10 during charging.

The system main relay circuit 36 is located between the battery pack 6 and the inverter 62. The system main relay circuit 36 includes a pair of relays 37P, 37N and a battery connector 38. The battery connector 38 is connected to a circuit extending from the battery pack 6. The pair of relays 37P and 37N electrically connects and disconnects the battery pack 6 and the inverter 62. The battery connector 38 of the system main relay circuit 36 is connected to the inverter 62 via the connector connection circuits 92P and 92N.

The upstream ends of the phase coils 43U, 43V, and 43W of the motor 42 are connected to each other at the neutral point 44. The downstream end of the U phase coil 43U of the motor 42 is connected to the inverter 62 via the U phase circuit 46U. Similarly, the downstream end of V phase coil 43V is connected to the inverter 62 via the V phase circuit 46V, and the downstream end of W phase coil 43W is connected to the inverter 62 via the W phase circuit 46W.

The inverter 62 is connected to the battery pack 6 via the system main relay circuit 36. The inverter 62 is a device that converts DC power from the battery pack 6 to AC power. The inverter 62 includes three upper switching elements 64U, 64V, 64W and three lower switching elements 66U, 66V, 66W. In the following, “switching element(s)” may be described as “SW element(s)”. The upper SW elements 64U, 64V, and 64W are connected in series with the lower SW elements 66U, 66V, and 66W, respectively.

The midpoint between the upper SW element 64U and the lower SW element 66U connected in series is electrically connected to the U phase coil 43U of the motor 42 via the U phase circuit 46U. As a result, the upper SW element 64U and the lower SW element 66U constitute a pair of upper and lower U phase arms that connect the U phase coil 43U of the motor 42 to a positive or negative terminal of the battery pack 6. Similarly, the upper SW element 64V and the lower SW element 66V connected in series constitute a pair of upper and lower V phase arms, and the midpoint therebetween is electrically connected to the V phase coil 43V of the motor 42 via the V phase circuit 46V. The upper SW elements 64W and the lower SW elements 66W connected in series constitute a pair of upper and lower W phase arms, and the midpoint therebetween is electrically connected to the W phase coil 43W of the motor 42 via the W phase circuit 46W. Operation of the three upper SW elements 64U, 64V, 64W, and the three lower SW elements 66U, 66V, 66W is controlled by a controller (not shown) of the electric vehicle 100.

Figure 3:
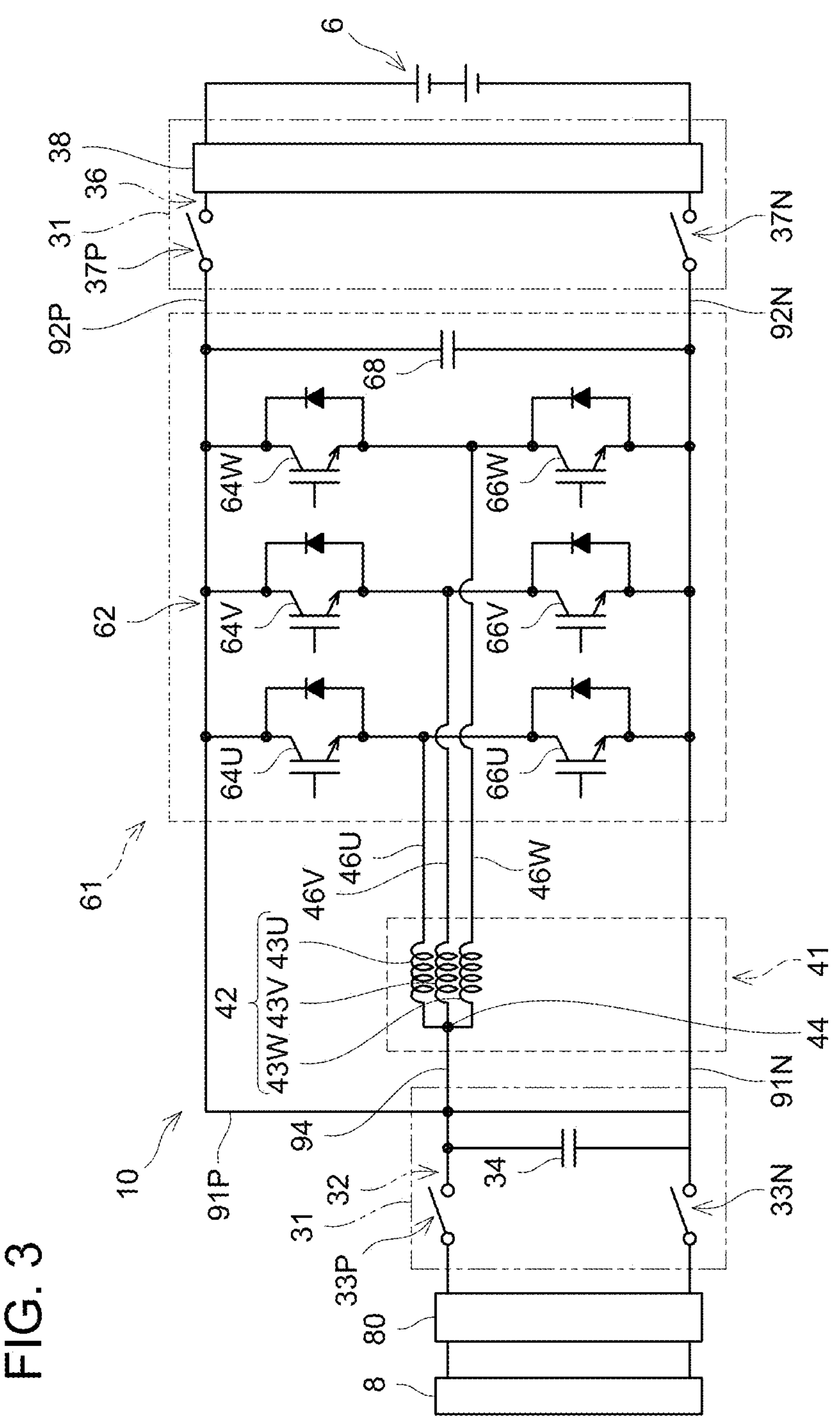
FIG. 3 shows a circuit diagram of the drive device 10 of the embodiment.

As shown in FIG. 3, the inverter casing 61 houses a traction smoothing capacitor 68 in addition to the inverter 62. The traction smoothing capacitor 68 stabilizes the voltage of the circuit of the drive device 10. The traction smoothing capacitor 68 is a filter capacitor to improve so-called EMC (Electromagnetic Compatibility).

Figure 4:
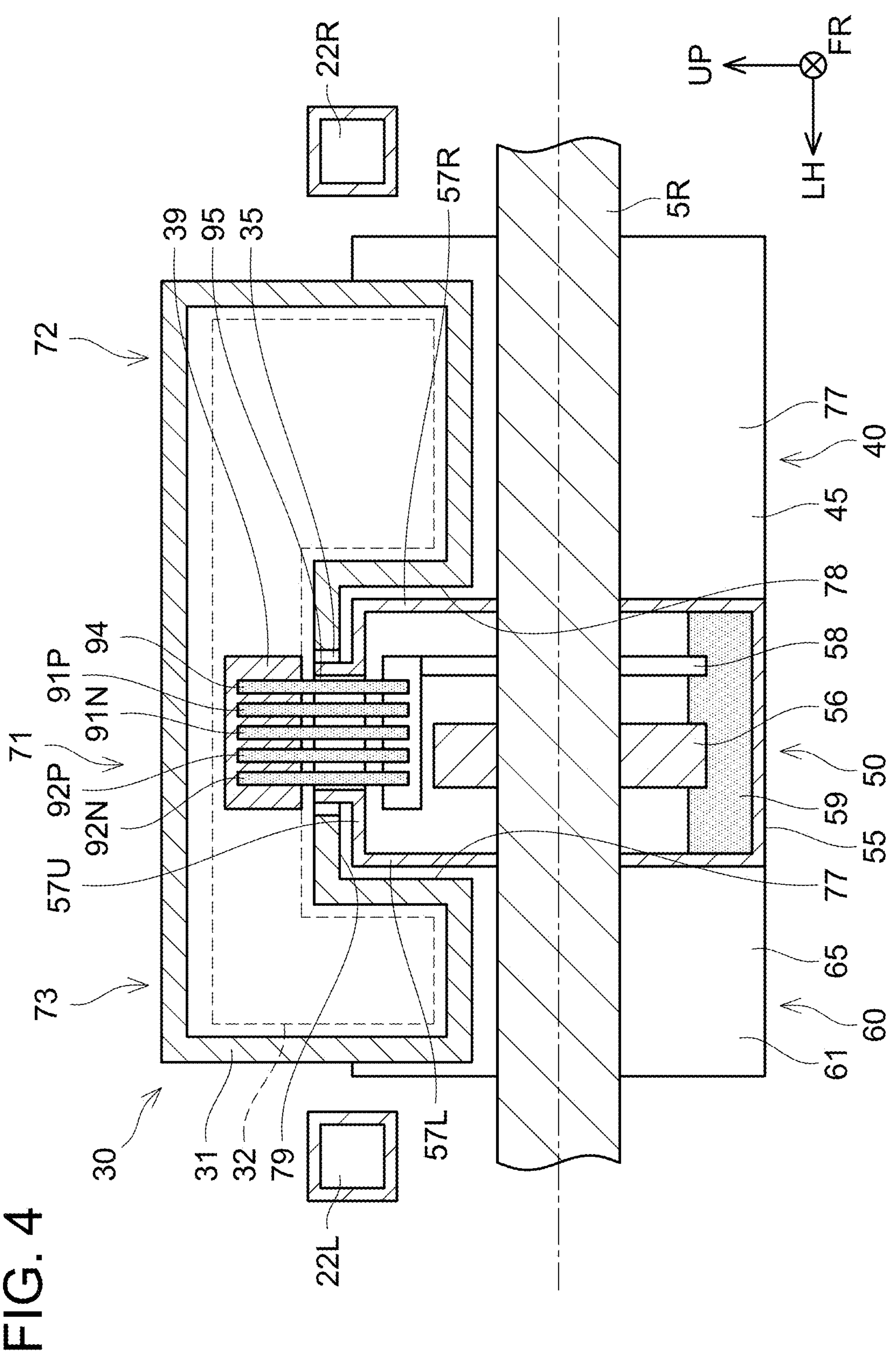
FIG. 4 shows a cross-sectional view along line IV-IV in FIG. 2.

Referring to FIGS. 2 and 4, a detailed shape of the relay casing 31 of the relay box 30 will be described. As shown in FIG. 2, the relay casing 31 includes a body portion 70, a first portion 71, a second portion 72, and a third portion 73. The body portion 70 is located above each of the casings 41, 51, 61 and has a rectangular shape. The first portion 71, the second portion 72 and the third portion 73 are connected to a rear portion of the body portion 70. The first portion 71 is located above the protruding portion 55 of the gear casing 51. As shown in FIG. 4, a lower surface 79 of the first portion 71 faces an upper surface 57U of the protruding portion 55 from above. The second portion 72 is located between the first portion 71 and the right upper arm 22R. The right outer edge of the second portion 72 extends along the upper arm 22R. The third portion 73 is located between the first portion 71 and the left upper arm 22L. The right outer edge of the third portion 73 extends along the upper arm 22L.

As mentioned earlier, the protruding portion 55 of the gear casing 51 protrudes rearward relative to the motor casing 41 and the inverter casing 61. The gear casing 51 is not present behind the motor casing 41. Thus, a space is present behind the motor casing 41. As shown particularly in FIG. 4, the second portion 72 of the relay casing 31 can extend downward toward the rear driveshaft 5R. Similarly, the third portion 73 can extend downward toward the rear driveshaft 5R at a position behind the inverter casing 61.

As a result, the left surface 78 of the second portion 72 faces the right surface 57R of the protruding portion 55 from the right side. In other words, the second portion 72 of the relay casing 31 faces the protruding portion 55 of the gear casing 51 from one side in the axial direction. Further, the front surface 74 of the second portion 72 faces the rear surface 45 of the motor casing 41 from behind. In other words, the second portion 72 of the relay casing 31 faces the motor casing 41 from behind.

Similarly, the right surface 77 of the third portion 73 faces the left surface 57L of the protruding portion 55 from the left side. In other words, the third portion 73 of the relay casing 31 faces the protruding portion 55 of the gear casing 51 from the other side in the axial direction. Further, the front surface 76 of the third portion 73 faces the rear surface 65 of the inverter casing 61 from behind. In other words, the third portion 73 of the relay casing 31 faces the inverter casing 61 from behind.

As a result, as particularly shown in FIG. 4, the protruding portion 55 of the gear casing 51 is space-efficiently arranged between the second portion 72 and the third portion 73 of the relay casing 31. Further, the second portion 72 of the relay casing 31 is located in a space between the protruding portion 55 of the gear casing 51 and the upper arm 22R of the rear suspension member 20. Similarly, the third portion 73 of the relay casing 31 is located in a space between the protruding portion 55 of the gear casing 51 and the upper arm 22L of the rear suspension member 20. As described above, in the drive device 10 of the present embodiment, by arranging the portions 70, 71, 72, and 73 of the relay casing 31 of the relay box 30 to conform to shapes of the casings 41, 51, 61, and the pair of upper arms 22L and 22R of the rear suspension member 20, the size can be reduced.

As shown particularly in FIG. 4, on the upper end of the gear casing 51, a pillar 95 extending upward from the upper surface 57U is provided. The pillar 95 includes a through hole extending in the up-down direction. The pillar 95 of the gear casing 51 is inserted into the connecting hole 35 in the relay casing 31. As a result, the interior of the gear casing 51 and the interior of the relay casing 31 are connected. Consequently, the inverter connection circuits 91P, 91N, the connector connection circuits 92P, 92N, and the neutral point connection circuit 94 pass through the connecting hole 35 and are connected to the relay circuits 32 and 36 in the relay casing 31. As described above, the drive device 10 of the present embodiment connects each of the circuits 91P, 91N, 92P, 92N to the relay circuits 32, 36 in the relay casing 31 through the connecting hole 35. This can suppress a size increase in the drive device 10 as compared to a configuration in which each of the circuits 91P, 91N, 92P, 92N is routed on the outer surface of the gear casing 51 and the relay casing 31.

Further, in the drive device 10 of the present embodiment, the inverter connection circuits 91P, 91N, the connector connection circuits 92P, 92N, and the neutral point connection circuit 94 are integrated in the gear casing 51 and pass through the connecting hole 35. Therefore, each of the circuits 91P, 91N, 92P, 92N, and 94 can be easily connected to its corresponding one of the relay circuits 32 and 36 in the relay casing 31 as compared to the configuration in which the circuits 91P, 91N, 92P, 92N, and 94 are separately routed. Further, the circuits 91P, 91N, 92P, 92N, 94 are so-called bus-bars and are self-supporting. Thus, each of the circuits 91P, 91N, 92P, 92N, 94 is inserted into the circuit connector 39 of its corresponding one of the relay circuits 32, 36 when the relay box 30 is mounted from above. This allows for easier connection as compared to a configuration employing wiring as each of the circuits 91P, 91N, 92P, 92N, 94.

As shown in FIG. 4, in the gear casing 51, each of the circuits 91P, 91N, 92P, 92N, 94 is covered by a heat dissipating member 58. The heat dissipating member 58 is constituted of a metal with high thermal conductivity, for example, aluminum. The heat dissipating member 58 extends downward in the gear casing 51 and its lower end is in contact with oil 59. The oil 59 cools each of the gears 52, 54, 56 within the gear casing 51. The heat dissipating member 58 cools each of the circuits 91P, 91N, 92P, 92N, 94 by dissipating heat from each of the circuits 91P, 91N, 92P, 92N, 94 to the oil 59. This allows the drive device 10 to cool each of the circuits 91P, 91N, 92P, 92N, 94 by using the oil 59 that cools each of the gears 52, 54, 56 in the gear casing 51.

As described above, in the drive device 10, the rotation axis A1 of the motor 42 extends in the horizontal direction. Further, in the drive device 10, the casings 41, 51, 61 are arranged from the right along the axial direction parallel to the rotation axis A1. Further, the relay casing 31 of the relay box 30 is mounted to each of the casings 41, 51, 61 from above. Therefore, as compared to a conventional technique in which, for example, the inverter casing 61 is mounted to the gear casing 51 from above, the drive device 10 including the relay box 30 can be suppressed from increasing in size, especially in the up-down direction. As a result, a height of the rear seat of the electric vehicle 100 can be made lower, and a passenger compartment of the electric vehicle 100 can accordingly be made larger. In addition, when the drive device 10 is arranged below a board that constitutes the bottom of the luggage space of the electric vehicle 100, the luggage space can be made larger.

(Corresponding Relationships) A downward direction with respect to the electric vehicle 100 is an example of "first direction", and a frontward direction with respect to the electric vehicle 100 is an example of "second direction". The battery connector 38 is an example of "connector". The rear suspension member 20 is an example of "subframe".

While the invention has been described in conjunction with various example structures outlined above and illustrated in the drawings, various alternatives, modifications, Variants, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, Variants, improvements, and/or substantial equivalents. Some specific examples of potential alternatives, modifications, or Variants in the described invention are provided below:

(Variant 1) The drive device 10 may be arranged at a front component of the electric vehicle 100. In that case, the drive device 10 may drive the front wheels 4F via the front driveshaft 5F. Further, the drive device 10 may be mounted to a front suspension member.

(Variant 2) The connecting hole 35 may not be defined in the bottom wall of the relay casing 31 of the relay box 30. In that case, for example, the inverter connection circuits 91P, 91N may be routed along the outer surface of the gear casing 51 toward the relay casing 31.

(Variant 3) The size of the relay box 30 in a width direction is modified according to the number of elements provided on the relay circuit housed in the relay casing 31. If the size of the relay casing 31 in the width direction is small, the relay box 30 may for example be mounted only to the gear casing 51 from above.

(Variant 4) The relay box 30 may be mounted to the gear casing 51 from behind or from below.

(Variant 5) The gear casing 51 may not include the protruding portion 55. In that case, the relay casing 31 of the relay box 30 may not have the second portion 72 or the third portion 73.

(Variant 6) The relay casing 31 of the relay box 30 may include only the second portion 72 and may not include the third portion 73.

(Variant 7) The drive device 10 may be directly mounted to the body 2 of the electric vehicle 100. In a further variant, the drive device 10 may be mounted to a side member extending in the front-rear direction instead of the rear suspension member 20.

(Variant 8) At least one of the inverter connection circuits 91P, 91N and the neutral point connection circuit 94 may not pass through the connecting hole 35. For example, the inverter connection circuits 91P and 91N may pass through the connecting hole 35 and the neutral point connection circuit 94 may pass through a different connecting hole or may be routed on the outer surface of the inverter casing 61 and connected to the charging relay circuit 32.

(Variant 9) The system main relay circuit 36 may not include the battery connector 38. In that case, the connector connection circuits 92P and 92N may not pass through the connecting hole 35.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A drive device, comprising:
an electric motor configured to drive a wheel of a vehicle;
a motor casing housing the electric motor;
a gear connected to the electric motor;
a gear casing housing the gear;
an inverter electrically connected to the electric motor;
an inverter casing housing the inverter; and
a relay box including at least one relay and having a relay circuit configured to connect a charging inlet provided on an outer surface of the vehicle to a neutral point of the electric motor and to the inverter, wherein
the motor casing, the gear casing, and the inverter casing are arranged in this order along an axial direction extending parallel to a rotation axis of the electric motor, and
the relay box is mounted at least to the gear casing in a first direction intersecting the rotation axis of the electric motor.

2. The drive device according to claim 1, wherein
a connecting hole is defined between the gear casing and the relay box, and
an inverter connection circuit connecting the inverter and the relay circuit extends from the inverter casing to the gear casing and passes through the connecting hole.

3. The drive device according to claim 1, wherein
the relay box is mounted to the motor casing, the gear casing, and the inverter casing in the first direction.

4. The drive device according to claim 1, wherein
the axial direction extends along a horizontal direction, and
the relay box is mounted at least on the gear casing from above.

5. The drive device according to claim 1, wherein
the gear casing includes a protruding portion protruding with respect to the motor casing and the inverter casing in a second direction intersecting the axial direction and the first direction,
the relay box includes a first portion facing the protruding portion in the first direction and a second portion facing the protruding portion from one side in the axial direction, and
the second portion of the relay box faces one of the motor casing and the inverter casing in the second direction.

6. The drive device according to claim 5, wherein
the relay box further includes a third portion facing the protruding portion from the other side in the axis direction,
the second portion of the relay box faces the motor casing in the second direction, and
the third portion of the relay box faces the inverter casing in the second direction.

7. The drive device according to claim 6, wherein
the drive device is mounted to a subframe fixed to a body of the vehicle, and
the second portion and the third portion of the relay box are located in a space between the protruding portion of the gear casing and the subframe.

8. The drive device according to claim 7, wherein
the subframe is a suspension member to which a suspension of the vehicle is fixed.

9. The drive device according to claim 1, wherein
a connecting hole is defined between the gear casing and the relay box, and
an inverter connection circuit connecting the inverter and the relay circuit and a neutral point connection circuit connecting the relay circuit and the neutral point of the electric motor pass through the connecting hole.

10. The drive device according to claim 1, wherein
a connecting hole is defined between the gear casing and the relay box,
the relay circuit further includes a connector to which a circuit extending from a battery of the vehicle is connected, and
an inverter connection circuit connecting the inverter and the relay circuit and a connector connection circuit connecting the inverter and the connector pass through the connecting hole.

11. The drive device according to claim 1, wherein
a connecting hole is defined between the gear casing and the relay box,
the relay circuit further includes a connector to which a circuit extending from a battery of the vehicle is connected, and
an inverter connection circuit connecting the inverter and the relay circuit, a neutral point connection circuit connecting the relay circuit and the neutral point of the electric motor, and a connector connection circuit connecting the inverter and the connector pass through the connecting hole.

12. The drive device according to claim 1, wherein
the charging inlet is configured to connect a battery of the vehicle to an external charging device.

13. The drive device according to claim 12, wherein
the charging inlet is configured to be detachably attached to a connector of the external charging device.

14. The drive device according to claim 13, wherein
the relay box houses the relay circuit which is configured to connect and disconnect the charging inlet provided on the outer surface of the vehicle to and from the electric motor, the inverter, and the battery of the vehicle.

15. The drive device according to claim 14, wherein
the relay box houses a further relay circuit configured to connect and disconnect the battery of the vehicle to and from the inverter.

16. A vehicle, comprising:
a drive device;
a battery configured to supply power to the drive device; and
a charging inlet provided on an outer surface of the vehicle, and configured to be detachably attached to a connector of an external charging device to connect the battery to the external charging device,
wherein the drive device comprises:
an electric motor configured to, using the power supplied from the battery, drive a wheel of the vehicle;
a motor casing housing the electric motor;
a gear connected to the electric motor;
a gear casing housing the gear;
an inverter electrically connected to the electric motor;
an inverter casing housing the inverter; and
a relay box including at least one relay and having a relay circuit configured to connect the charging inlet provided on the outer surface of the vehicle to a neutral point of the electric motor and to the inverter, wherein
the motor casing, the gear casing, and the inverter casing are arranged in this order along an axial direction extending parallel to a rotation axis of the electric motor, and the relay box is mounted at least to the gear casing in a first direction intersecting the rotation axis of the electric motor.

17. The vehicle according to claim 16, wherein the relay box houses the relay circuit which is configured to connect and disconnect the charging inlet provided on the outer surface of the vehicle to and from the electric motor, the inverter, and the battery.

18. The vehicle according to claim 17, wherein the relay box houses a further relay circuit configured to connect and disconnect the battery to and from the inverter.

* * * * *